(12) United States Patent
Tamaki et al.

(10) Patent No.: US 7,379,744 B2
(45) Date of Patent: May 27, 2008

(54) POSITIONING SYSTEM, POSITIONING METHOD, AND POSITIONING SERVER

(75) Inventors: Tsuyoshi Tamaki, Tokyo (JP); Takashi Yano, Tokorozawa (JP); Satoshi Tamaki, Tokyo (JP); Ryouichi Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 11/017,135

(22) Filed: Dec. 21, 2004

(65) Prior Publication Data

US 2005/0143092 A1 Jun. 30, 2005

(30) Foreign Application Priority Data

Dec. 24, 2003 (JP) ............................. 2003-426288

(51) Int. Cl.
*H04Q 7/20* (2006.01)
(52) U.S. Cl. ............................. 455/456.5; 455/456.1; 455/404.2; 455/422.1; 455/67.11; 455/423; 342/126; 342/387; 342/463; 342/464; 342/465
(58) Field of Classification Search ..... 455/456.1–457, 455/5, 422.1, 404.2, 423–425, 67.11–67.16, 455/446–447; 342/451, 126, 387, 463–465
See application file for complete search history.

(56) References Cited

U.S. PATENT DOCUMENTS

| | | | | |
|---|---|---|---|---|
| 4,799,062 A | * | 1/1989 | Sanderford et al. | 342/450 |
| 4,916,455 A | * | 4/1990 | Bent et al. | 342/457 |
| 5,095,500 A | * | 3/1992 | Tayloe et al. | 379/32.01 |
| 5,303,240 A | * | 4/1994 | Borras et al. | 370/347 |
| 5,883,598 A | * | 3/1999 | Parl et al. | 342/457 |
| 6,061,018 A | * | 5/2000 | Sheynblat | 342/357.06 |
| 6,212,392 B1 | * | 4/2001 | Fitch et al. | 455/456.2 |

(Continued)

FOREIGN PATENT DOCUMENTS

JP  07-181242  12/1993

OTHER PUBLICATIONS

Ogino, A. et al., "Integrated Wireless LAN Access System (1) Study on Location System", 2003 IEICE General Meeting, p. 662, with 5 pages of English translation.

*Primary Examiner*—Sharad Rampuria
(74) *Attorney, Agent, or Firm*—Reed Smith LLP; Stanley P. Fisher, Esq.; Juan Carlos A. Marquez, Esq.

(57) ABSTRACT

To provide a positioning system, a positioning method, and a positioning server, which are capable of improving accuracy in detection of a position. In a positioning system, three or more access points connected to a terminal station by wireless communication are connected to a positioning server through a network, the access points transmit, to the positioning server, information regarding times of having received a signal transmitted from any one of the access points or the terminal station, and the positioning server measures a position of the terminal station based on the information regarding the times, the information having been received from the access points. In the positioning system, the access points select a communication method for maximizing a strength of the signal received from the terminal station and receive the signal from the terminal station, and the positioning server measures the position of the terminal station based on the information regarding the times, the information having been received from the access points.

12 Claims, 7 Drawing Sheets

U.S. PATENT DOCUMENTS

| | | | |
|---|---|---|---|
| 6,249,252 B1 * | 6/2001 | Dupray | 342/450 |
| 6,252,543 B1 * | 6/2001 | Camp | 342/357.06 |
| 6,353,412 B1 * | 3/2002 | Soliman | 342/387 |
| 6,885,860 B2 * | 4/2005 | Bahl et al. | 455/414.1 |
| 6,892,054 B2 * | 5/2005 | Belcher et al. | 455/63.1 |
| 6,901,264 B2 * | 5/2005 | Myr | 455/456.5 |
| 6,980,806 B2 * | 12/2005 | Muramoto et al. | 455/446 |
| 7,079,850 B2 * | 7/2006 | Cameron | 455/456.1 |
| 7,139,527 B2 * | 11/2006 | Tamaki et al. | 455/16 |
| 2002/0132624 A1 * | 9/2002 | Watanabe et al. | 455/456 |
| 2003/0129996 A1 * | 7/2003 | Maloney et al. | 455/456 |
| 2005/0130677 A1 * | 6/2005 | Meunier et al. | 455/456.6 |

* cited by examiner

FIG.7

POSITIONING SYSTEM, POSITIONING METHOD, AND POSITIONING SERVER

CLAIM OF PRIORITY

The present application claims priority from Japanese application P2003-426288 filed on Dec. 24, 2003, the content of which is hereby incorporated by reference into this application.

BACKGROUND OF THE INVENTION

This invention relates to a positioning system, which measures a position of a node having a wireless transmission function, and particularly to a positioning system, a positioning method, and a positioning server, which are highly accurate in position detection.

As a conventional representative method of measuring a node position, there is a method of measuring the node position by use of a signal from a satellite such as a GPS.

As another conventional method of measuring the node position, there is a method, in which the node receives signals from a plurality of access points, and the node position is calculated from differences among received times of the signals.

Specifically, there has been proposed a method of detecting a position of a terminal station, which is used for a cellular phone system, and in which differences among received times of signals transmitted from access points to the terminal station (time differences T1–T2 and T3–T2 between propagations of the signals from the respective access points to the terminal station) are calculated, the time differences between the propagations are multiplied by the velocity of light, and distance differences between the propagations of the signals from the terminal station to the respective access points are calculated, the distance differences being represented as:

$D1-D2=c(T1-T2)$; and $D3-D2=c(T3-T2)$ (for example, refer to JP 07-181242 A).

Moreover, there has been proposed a method of detecting a position of a node, which is used for a wireless LAN system, and in which time differences among receipts of a signal transmitted from the node (terminal station) by the access points (time differences Ti–T1 among the receipts by the respective access points) are calculated, the time differences among the receipts are multiplied by the velocity of light, and distance differences $\{|P-Pi|-|P-P1|\}=c(Ti-T1)$, i=2, ..., n among propagations of the signal from the node to the respective access points are calculated (for example, refer to "Integrated Wireless LAN Access System—Study on Location System", Atsushi Ogino and 5 others, Proceeding of the 2003 IEICE Society Conference, The Institute of Electronics, Information and Communication Engineers, B-5-203, p. 662).

SUMMARY OF THE INVENTION

However, while such a conventional position detection method uses the signal from the terminal station for the position detection, the signal received by the node becomes one in which a reflective wave is synthesized with a direct wave in an environment where there is a reflector which reflects the signal used for the position detection.

In the conventional position detection method, positioning is performed based on a rise time of the signal in order to detect the direct wave even in a state where the reflective wave is synthesized therewith in the signal. However, when the reflective wave is large, an influence thereof on deterioration of measurement accuracy for received timing of the signal cannot be ignored. Accordingly, a mechanism for reducing the reflective wave is desired.

This invention has been made in consideration of such a problem as described above. It is therefore an object of this invention to provide a positioning system, a positioning method, and a positioning server, which are capable of reducing measurement errors in the received timing of the signal sent from the terminal station, in other words, errors in the position measurement, by reducing the influence of the reflective wave as much as possible.

According to an embodiment of this invention, a plurality of positioning measurement signal requests and positioning measurement signal replies for a position measurement of a terminal station 10 are transmitted, and access points 30 receive the plurality of signals (signal requests and replies) while individually changing directivity therefor, and send a plurality of results of the receipt to a positioning server 20. The positioning server 20 calculates a combination of directivity, which brings a best result among the plurality of results, and sends the directivity to the respective access points.

According to this invention, a direct wave of the positioning measurement signal request from the terminal station can be received as accurately as possible even under an environment, such as in a building, where a reflective wave occurs, and accuracy in the position measurement is enhanced.

DETAILED DESCRIPTION OF THE PREFERRED EMBODIMENTS

A first embodiment of this invention will be described with reference to the drawings.

Figure 1:
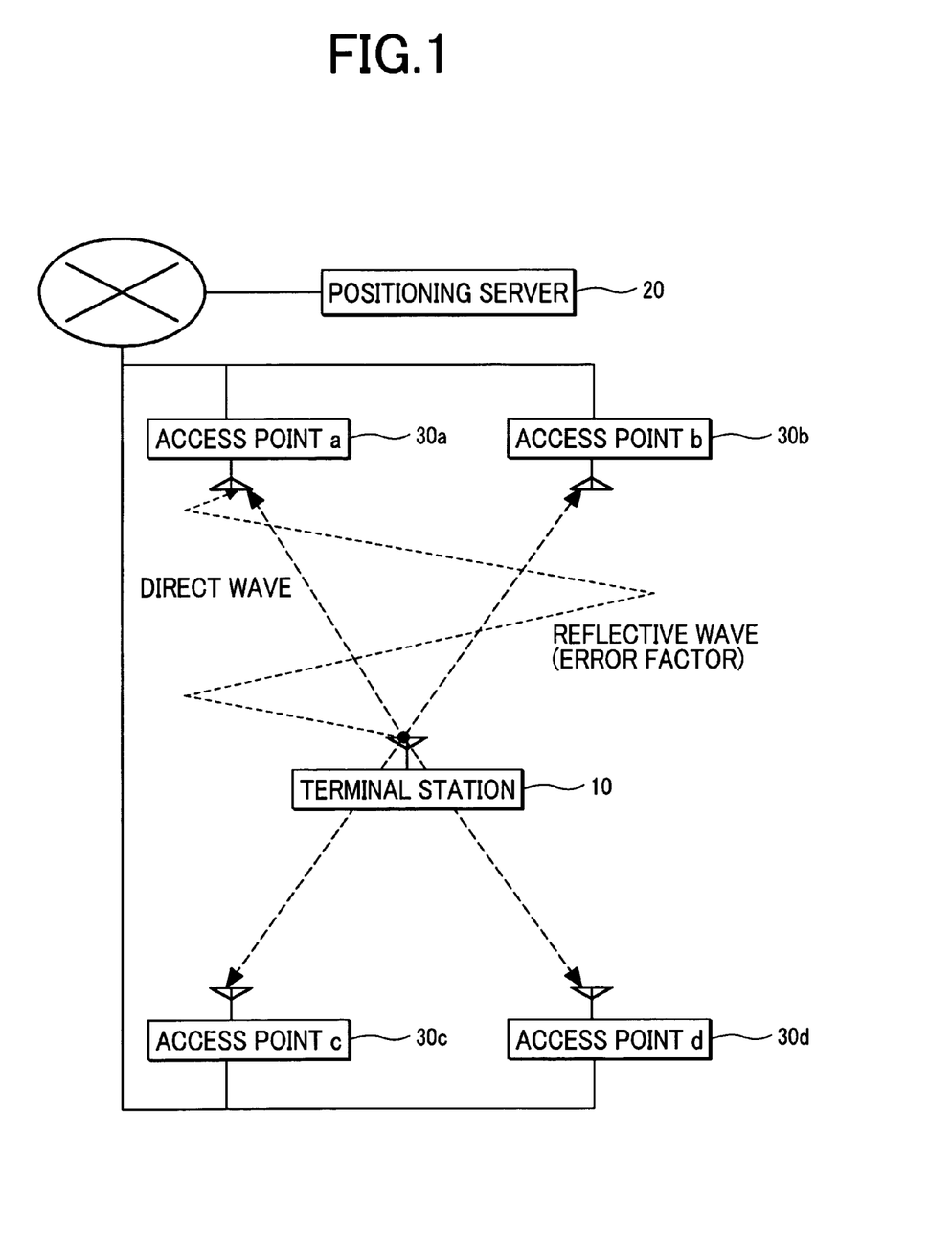
FIG. 1 is a configuration diagram of a positioning system according to a first embodiment of this invention.

FIG. 1 is a configuration diagram of a positioning system according to a first embodiment of this invention.

A positioning server 20 which gives an instruction and calculates to measure a position is connected to a plurality of access points (30a, 30b, 30c, and 30d) through a network

40. A terminal station 10 is connected to the plurality of access points 30 through wireless communication, and communicable with any one or a plurality of the access points 30.

An antenna 31 (refer to FIG. 2) is connected to each of the access points 30. The antenna 31 is composed, for example, of an adaptive array antenna or the like, and set to be capable of changing a directivity thereof.

The terminal station 10 transmits signals to the access points 30. The signal is transmitted directly to the access points 30 as a direct wave, and a reflective wave is added to the direct wave at a place such as, for example, outdoors where buildings are heavily built up and an inside of the building. In the positioning system, the reflective wave is an error factor to measure the position of the access terminal 10.

Figure 2:
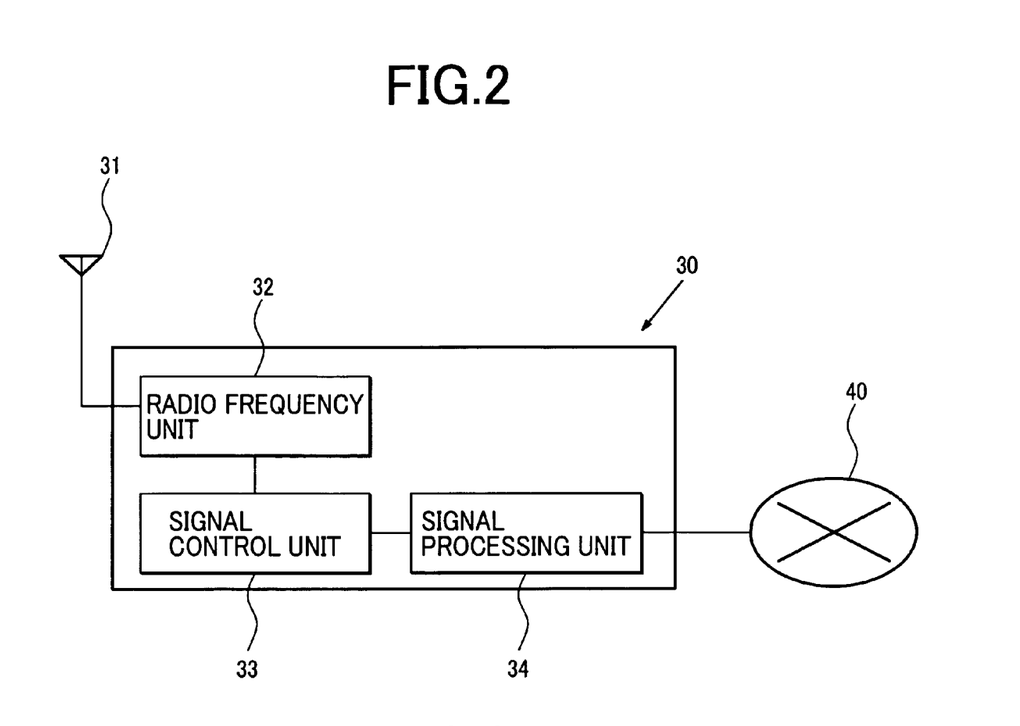
FIG. 2 is a configuration block diagram of an access point according to the first embodiment of this invention.

FIG. 2 is a configuration block diagram of the access point 30.

The access point 30 is composed of the antenna 31, a radio frequency part 32, a signal control part 33, a signal processing part 34, and the like.

The antenna 31 converts an electric wave transmitted from another access point 30 or the like into a high-frequency signal and sends the high-frequency signal to the radio frequency part 32, and converts a high-frequency signal generated by the radio frequency part 32 into an electric wave and transmits the electric wave. The antenna 31 is composed of the adaptive array antenna or the like, and capable of changing the directivity thereof. Not only the adaptive array antenna but also an antenna capable of changing a directivity thereof by physically controlling an orientation thereof may be used. For example, a plurality of antennas each of which has a specific directivity may be combined to constitute an antenna part, and an antenna having a desired directivity among the antennas may be selected for use.

The radio frequency part 32 coverts the high-frequency signal received from the antenna 31 into a control signal (data signal) and the like, and sends the high-frequency signal to the antenna 31 according to an instruction of the signal control part 33. Thus, the antenna 31 transmits the electric wave to the terminal station 10 and the like.

Moreover, the radio frequency part 32 controls the directivity, received power, frequency, polarization, and the like of the antenna 31. For example, a predetermined directivity is set for the antenna 31, and thus the antenna 31 can be controlled to receive only an electric wave from a predetermined orientation.

The signal control part 33 controls a position measurement of the terminal station 10. For example, in a system in which a plurality of the terminal stations 10 are present, the respective terminal stations 10 transmit signals with waveforms unique thereto, and the access point 30 specifies each terminal stations 10 as transmission sources by comparing information on the terminal stations 10, which is applicable to the unique waveforms, by using information prestored in the signal control part 33.

As a method of comparing the received unique waveforms and such prestored waveforms with each other, for example, there is a method in which correlation values between both are calculated, and a received waveform in which the correlation value becomes the maximum is determined to be most similar to a prestored waveform concerned.

Moreover, the signal control part 33 creates capture data of a positioning measurement signal, which includes information on a time difference between capture data of a positioning measurement signal request and capture data of a positioning measurement signal reply, information which specifies the terminal station 10 as the transmission source or the access point 30, and information on the directivity and the like of the antenna 31 when receiving the positioning measurement signal request.

The signal processing part 34 functions as an interface which connects the access point 30 to the network 40. The signal processing part 34 receives a request from the positioning server 20, and transmits the capture data of the positioning measurement signal, which is created by the signal control part 33, to the positioning server 20.

Figure 3:
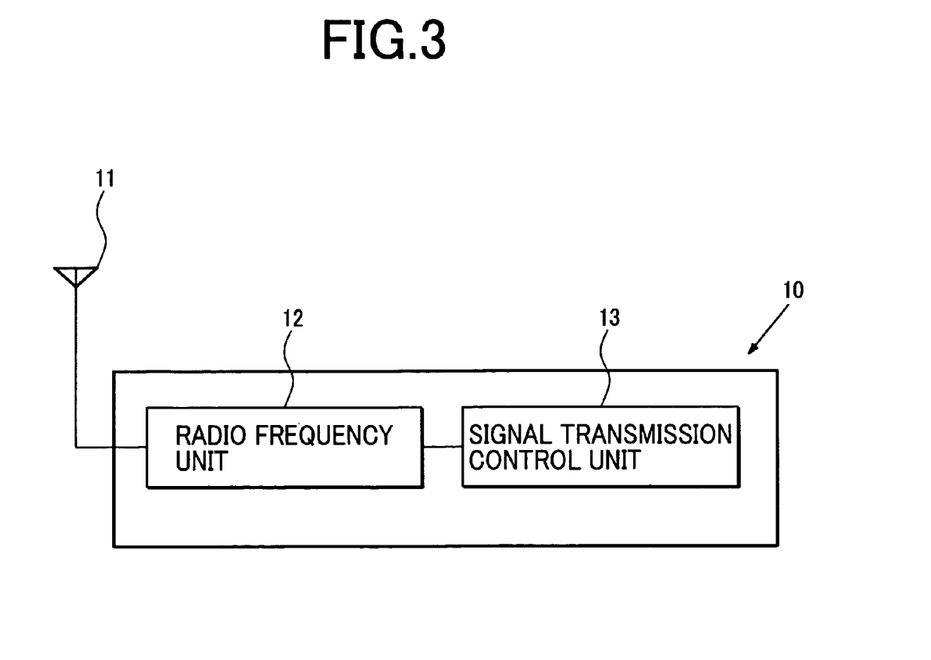
FIG. 3 is a configuration block diagram of a terminal station according to the first embodiment of this invention.

FIG. 3 is a configuration block diagram of the terminal station 10.

The terminal station 10 is composed of an antenna 11, a radio frequency part 12, a signal transmitting control part 13, and the like.

The radio frequency part 12 converts the high-frequency signal, which is transmitted from the access point 30 and received by the antenna 11, into a data signal. Moreover, based on an instruction from the signal transmitting control part 13, the radio frequency part 12 creates the positioning measurement signal reply, outputs the created positioning measurement signal reply as a high-frequency signal with the antenna 11, and transmits the high-frequency signal to the respective access points 30. The positioning measurement signal reply has a waveform uniquely assigned to each terminal station 10. This unique waveform makes it possible to identify whether the positioning measurement signal reply is a signal transmitted by the terminal station 10 concerned.

Upon receiving the positioning measurement signal request received by the radio frequency part 12, the signal transmitting control part 13 instructs the radio frequency part 12 to transmit the positioning measurement signal reply as a reply thereto.

Figure 4:
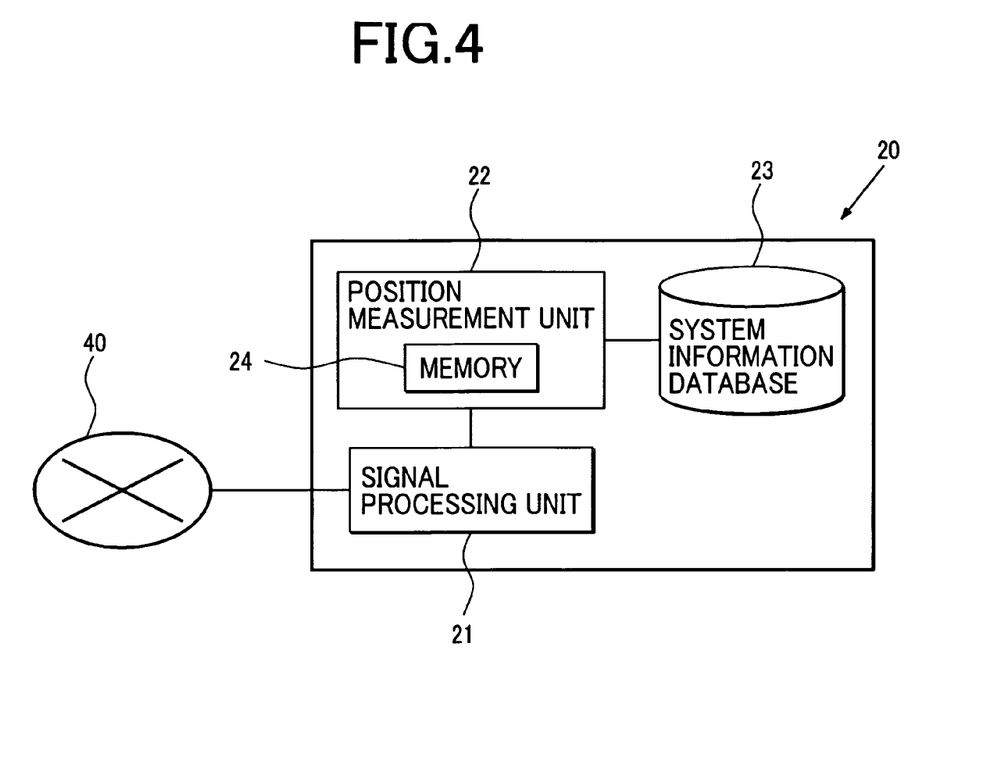
FIG. 4 is a configuration block diagram of a positioning server according to the first embodiment of this invention.

FIG. 4 is a configuration block diagram of the positioning server 20.

The positioning server 20 is composed of a signal processing part 21, a position measurement part 22, a system information database 23, and the like.

The signal processing part 21 functions as an interface which connects the positioning server 20 to the network 40. The signal processing part 21 receives the capture data of the positioning measurement signal, which is sent from each access point 30, and sends the received capture data of the positioning measurement signal to the position measurement part 22.

The position measurement part 22 calculates a position of the terminal station 10 based on information time differences between the capture data of the positioning measurement signals at the respective access points 30, which is included in the capture data of the positioning measurement signals, and based on information including positions of the respective access points 30, which is prestored in the system information database 23.

Figure 5:
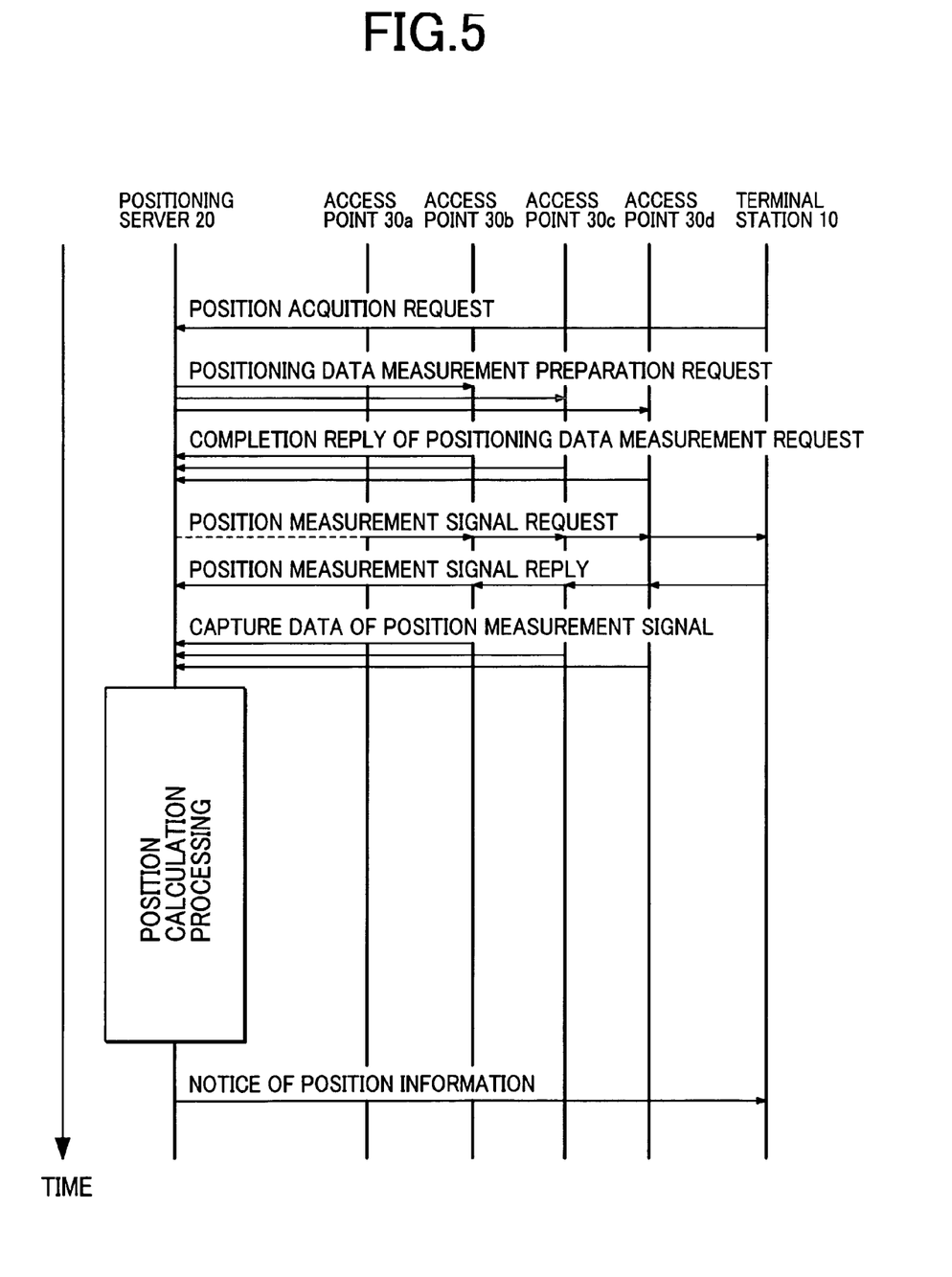
FIG. 5 is a sequential diagram of a procedure for measuring a position by the positioning system according to the first embodiment of this invention.

FIG. 5 is a sequential diagram of a procedure for measuring a position by the positioning system according to the first embodiment of this invention.

First, the terminal station 10 transmits a position acquisition request for requesting position measurement of itself from the positioning server 20, through any of the access points 30 to the positioning server 20. Upon receiving the position acquisition request, the positioning server 20 first transmits positioning data measurement preparation requests to the respective access points 30. Each positioning data measurement preparation request can include information regarding the directivity of the antenna 31 of each access point 30 and information regarding the frequency for use.

Upon receiving the positioning data measurement preparation request, each access point 30 prepares a setting of the directivity of the antenna 31, and the like. When the preparation is completed, each access point 30 transmits a completion reply of the positioning data measurement request to the positioning server 20.

Upon receiving the completion replies of the positioning data measurement requests from all the access points 30, the positioning server 20 first sends, to the access point 30a, an instruction to transmit the positioning measurement signal requests. Upon receiving the instruction, the access point 30a transmits the positioning measurement signal requests to the terminal station 10. The other access points 30b, 30c, and 30d, monitor above the positioning measurement signal requests. The access point 30a stores a transmitted time of the positioning measurement signal requests, and the access points 30b, 30c, and 30d store received times of the positioning measurement signal requests. The access point 30a transmits the positioning measurement signal requests, a plurality of signals, a predetermined number of times. Each access point 30 receives the plurality of signals while changing the directivity of the antenna 31 for each of the signals, and stores received times of the signals. For example, when three positioning measurement signal requests are transmitted, each access point 30 changes the directivity for each of the three signal requests, and receives the signal requests.

Upon receiving the positioning measurement signal requests, the terminal station 10 transmits the positioning measurement signal replies to the access points 30a. The access points 30b, 30c, and 30d, monitor the positioning measurement signal replies. The respective access points 30a, 30b, 30c, and 30d store received times of the positioning measurement signal replies. In a similar way, the access point 30a transmits the positioning measurement signal requests, a plurality of signals, a predetermined number of times. Each access point 30 receives the plurality of signals while changing the directivity of the antenna 31 for each of the signals, and stores received times of the signals. The directivity thus changed is set the same as that when each positioning measurement signal request is received.

Next, each of the access points 30a, 30b, 30c, and 30d calculates the time differences between capture data of the positioning measurement signals between the received time of the positioning measurement signal request and the received time of the positioning measurement signal reply. Then, each access point 30 creates the capture data of the positioning measurement signal from the time differences between capture data of the positioning measurement signals and from other information, and transmits the capture data of the positioning measurement signal to the positioning server 20. The capture data of the positioning measurement signal includes, for each access point 30, information regarding the received times of the positioning measurement signal requests, the positioning measurement signal replies which have been received the plurality of times, regarding the directivity of each antenna 31, and information regarding each access point 30 which has received the positioning measurement signal requests.

Upon receiving the capture data of the positioning measurement signals from the respective access points 30a, 30b, 30c, and 30d, the positioning server 20 executes position calculation processing of the terminal station 10 based on the information. Details of the position calculation processing are described later.

Next, the positioning server 20 transmits position information of the terminal station 10, which has been decided by the position calculation processing, to the terminal station 10.

By a series of the processing described above, measurement of the position information of the terminal station 10 is completed.

It should be noted that the position measurement may be performed not only by the position acquisition request from the terminal station 10 but also by the positioning server 20 and by a request from the respective access point 30.

Moreover, when the antenna 31 is composed of the adaptive array antenna, it is not always necessary to transmit the plurality of positioning measurement signal requests and positioning measurement signal replies. When the antenna 31 is composed of the adaptive array antenna, each access point 30 can obtain results of the plurality of directivity by a single signal.

Figure 6:
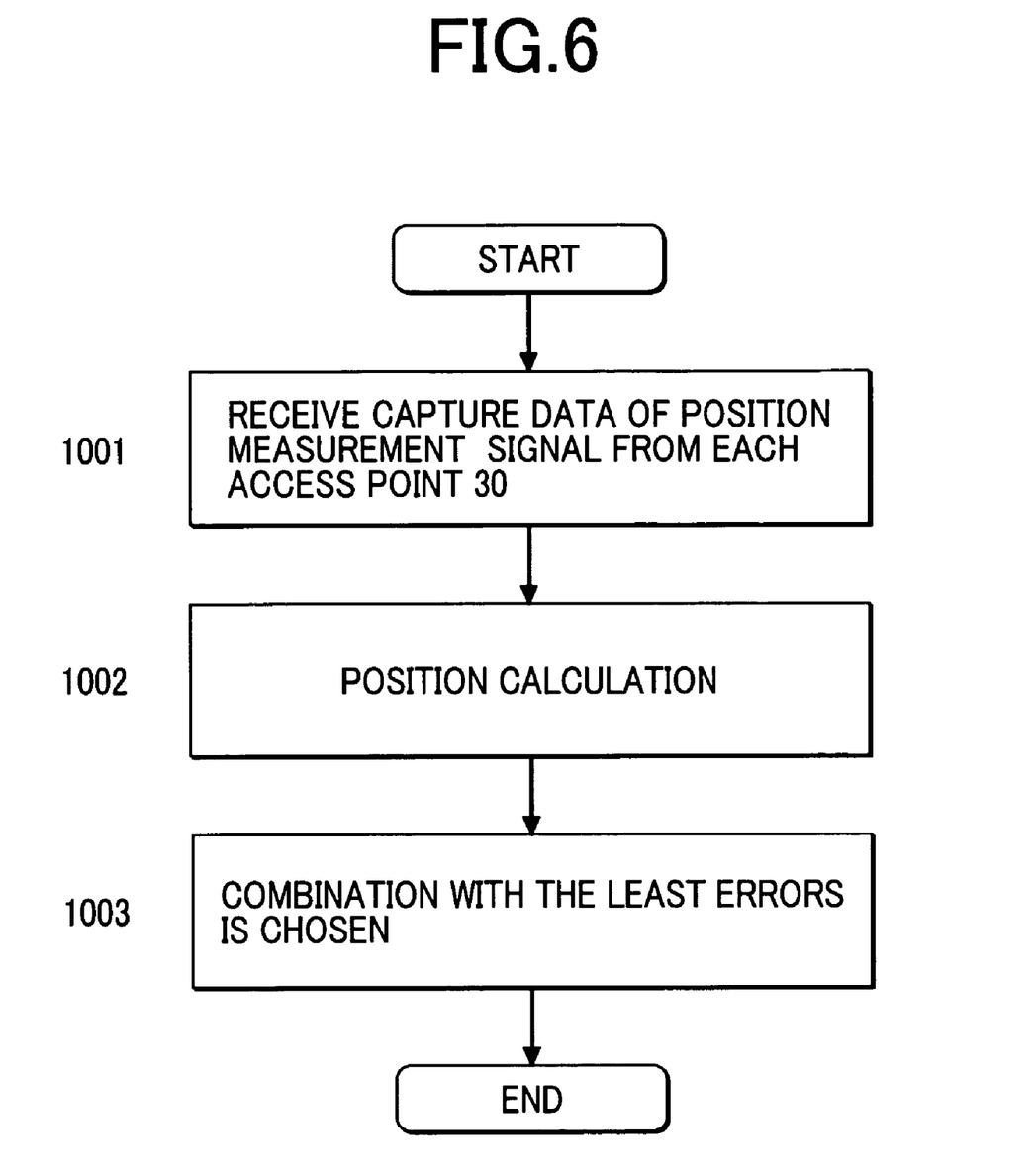
FIG. 6 is a flowchart of details of position calculation processing in the positioning server according to the first embodiment of this invention.

FIG. 6 is a flowchart of the details of the position calculation processing in the positioning server 20.

The position measurement part 22 of the positioning server 20 receives the capture data of the positioning measurement signal from each access point 30, which has been transmitted through the network 40 and the signal processing part 21 (step 1001).

Next, the position measurement part 22 calculates the position of the terminal station 10 based on the received capture data of the positioning measurement signal of each access point 30 (step 1002).

There are some methods for calculating the position of the terminal station 10. For example, a difference between distances between the terminal station 10 and two access points 30 is calculated from a time difference between receipts of the positioning measurement signal requests by the two access points 30. Then, the position of the terminal station 10 of which positioning is to be measured is specified from intersections of at least two hyperbolas drawn by connecting points satisfying a condition of such a distance difference. Such a method is called a hyperbola intersection. Moreover, a hyperbola intersection may be used, in which weighting is performed based on a received strength of the positioning measurement signal request received by the access point 30 in the case of position calculation using a difference between a transmitted time of a reference signal and the received time of the position measurement signal request.

Moreover, the position measurement part 22 calculates the position of each access point for each of the time differences between capture data of the positioning measurement signals, which have been received by means of the plurality of directivity, with reference to information indicating the directivity of the antenna 31, which is included in the received capture data of the positioning measurement signals. For example, in the case of receiving the capture data of the positioning measurement signals three times while individually changing the directivity by the three positioning measurement signal requests and the three positioning measurement signal replies as described above, the position calculation is performed for all the combinations of results of three receipts of each access point, and consequently, 27 ways of calculation results are obtained.

Next, a combination with the least errors is selected from the calculation results corresponding to the plurality of directivity (step 1003). The result of the position measurement is obtained from the intersections of the hyperbola in which the distances from the respective access points 30 are drawn. Accordingly, when positions of the intersections resulting from the plurality of access points 30 are approximate to each other, the errors are a little, and when the positions are dispersed, the errors are much. The combination in which the positions of the intersections are the most approximate to each other is selected from the calculation results of calculating the results of the receipts by the respective access points 30 by means of the respective directivity. As a result, the following combinations are selected as the calculation results with the least errors, for example, which are: the access point 30*a* and a directivity A; the access point 30*b* and a directivity B; the access point 30*c* and a directivity C; and the access point 30*d* and a directivity D. Specifically, the signal processing part 21 selects a communication method (for example, the directivity) with the least errors for each of the access points in the step 1003, and thus a state selecting part is composed.

In such a manner as described above, the directivity in the case of receiving, by the access points 30*b* to 30*d*, the signal transmitted from the terminal station 10, are controlled. The optimum directivity for receiving, by the access points 30*b* to 30*d*, the signal transmitted from the access point 30*a* can be preset. If installation locations of the access points are decided, the optimum directivity for receiving, in each access point, the signals from the other access points are decided based on the position of each access point and an environment of a shield, a reflector, and the like in a periphery thereof. Hence, if the directivity suitable for the other access points are registered in advance for each of the access points, and information specifying the access point 30*a* which transmits the positioning measurement signal requests is notified in the case of sending the positioning data measurement preparation request, then the access points 30*b* to 30*d* which have received such a notice can prepare to receive the positioning measurement signal requests by means of the directivity consistent with the access point 30*a*. After receiving the positioning measurement signal requests, the access points 30*b* to 30*d* set the antennas to the directivity decided by the above-described method, and turn to a standby state for receiving the positioning measurement signal replies.

The positioning server 20 temporarily stores the information regarding the directivity of the respective access points 30, which brings the results with the least errors. When the position acquisition request is issued at the next time, this information regarding the directivity is included in the positioning data measurement preparation requests to be transmitted to the respective access points 30, and then transmitted. Each access point 30 preferentially uses the directivity included in the received positioning data measurement preparation request, and receives the positioning measurement signal requests and the positioning measurement signal replies by means of the plurality of directivity with the directivity concerned taken as a center.

As described above, in the positioning system according to the first embodiment of this invention, the plurality of positioning measurement signal requests and positioning measurement signal replies for measuring the position of the terminal station 10 are transmitted, and the access points 30 receive the plurality of signals while changing the directivity individually therefor, and send the plurality of results to the positioning server 20. The positioning server 20 calculates the combinations of the directivity, which bring the best results among the plurality of results, and sends the directivity in the calculated combinations to the respective access points. In such a manner, the errors in the position measurement can be reduced by use of so-called directivity diversity which sets the directivity to an orientation in which the direct wave can be received such that an influence of the reflective wave is minimized even if the reflective wave is added to the positioning measurement signal request at a place such as, for example, outdoors where buildings are heavily built up and an inside of the building.

Although a configuration is adopted such that the plurality of signals are received by changing the directivity in the first embodiment, so-called frequency diversity in which the plurality of signals are received by changing transmitting/receiving frequencies may also be used, and so-called polarization diversity in which the plurality of signals are received by changing polarizations may also be used.

When the frequencies of the signals are changed, the transmitting frequencies are decided in advance by the positioning server 20, and information regarding the frequencies is included in the positioning data measurement preparation requests, and then transmitted. Each access point 30 individually receives the signals transmitted at the plurality of frequencies, and transmits results thereof to the positioning server 20.

When the frequencies and polarizations of the signals are changed, the influence of the reflective wave on the signals is also changed, and accordingly, a frequency or polarization with the least errors, that is, with the least influence of the reflective wave is selected. For this purpose, it is recommended to transmit a signal which designates the frequency or the polarization from the positioning server to the terminal station 10 through the access point 30*a* which manages the terminal station 10.

Moreover, power of the positioning measurement signal request transmitted by the access point 30*a* and power of the positioning measurement signal reply transmitted by the terminal station 10 may be changed so as to be transmission power which is the minimum necessary for the positioning measurement.

The positioning server 20 sends an instruction to lower the transmission power of the terminal station 10 when the errors in detecting the position are large. Moreover, when many access points 30 become unable to receive the wave transmitted by the terminal station 10 because the power is lowered too much, the positioning server 20 controls to increase the transmission power of the terminal station 10 by giving an instruction to such an effect thereof. For this purpose, a transmission power control signal is transmitted from the positioning server to the terminal station 10 through the access point 30*a* which manages the terminal station 10.

Furthermore, a procedure may be adopted, in which, in the positioning server 20, the transmission power of the terminal station 10, the result of the position measurement of the terminal station 10 and a correspondence relationship between the detection errors are recorded in a memory of the position measurement part 22, and the optimum power is indicated among the recorded information to the terminal station 10. Moreover, another procedure may be adopted, in which the lowest received power at which the direct wave can be detected by the access point 30 is obtained, a difference between the lowest received power and the actual received power is notified to the positioning server 20, and the position server 20 computes transmission power of the terminal station 10, which satisfies the difference, decides a reduction range of the transmission power, and notifies the terminal station 10 of the reduction range.

Next, a positioning system according to a second embodiment of this invention will be described.

In the first embodiment, a configuration is adopted such that the directivity with less error is calculated based on the results of receiving the plurality of signals, which are obtained by changing the directivity. In the second embodiment, a setting is made such that the directivity of the antenna 31 of each access point 30 is changed to a directivity of an estimated position of the terminal station 10 based on a positioning result of the positioning server 20.

It should be noted that the same reference numerals are added to the same constituent elements as those in the first embodiment, and description thereof is omitted.

A sequence in the positioning system of the second embodiment is substantially the same as that described with reference to FIG. 5.

First, the terminal station 10 transmits a position acquisition request for requesting position measurement of itself to the positioning server 20. Upon receiving the position acquisition request, the positioning server 20 first transmits positioning data measurement preparation requests to the respective access points 30. Each positioning data measurement preparation request can include information regarding the directivity of the antenna 31 of each access point 30 and information regarding the frequency for use. Upon receiving the positioning data measurement preparation request, each access point 30 prepares a setting of the directivity of the antenna 31, and the like. When the preparation is completed, each access point 30 transmits a completion reply of the positioning data measurement request to the positioning server 20.

Upon receiving the completion replies of the positioning data measurement requests from all the access points 30, the positioning server 20 first sends, to the access point 30a, an instruction to transmit the positioning measurement signal requests. Upon receiving the instruction, the access point 30a transmits the positioning measurement signal requests to the other access points 30b, 30c, and 30d, and the terminal station 10. The access point 30a stores a transmitted time of the positioning measurement signal requests, and the access points 30b, 30c, and 30d store received times of the positioning measurement signal requests.

Upon receiving the positioning measurement signal requests, the terminal station 10 transmits the positioning measurement signal replies to the respective access points 30. The respective access points 30a, 30b, 30c, and 30d individually store received times of the positioning measurement signal replies.

Next, each of the access points 30a, 30b, 30c, and 30d calculates the time differences between capture data of the positioning measurement signals between the received time of the positioning measurement signal request and the received time of the positioning measurement signal reply. Then, each access point 30 creates the capture data of the positioning measurement signal from the time differences between capture data of the positioning measurement signals and from other information, and transmits the capture data of the positioning measurement signal to the positioning server 20. The capture data of the positioning measurement signal includes, for each access point 30, information regarding the directivity of each antenna 31 and information regarding each access point 30.

Upon receiving the capture data of the positioning measurement signals individually from the access points 30a, 30b, 30c, and 30d, the positioning server 20 executes position calculation processing of the terminal station 10 based on the information.

Next, the positioning server 20 transmits position information of the terminal station 10, which has been decided by the position calculation processing, to the terminal station 10.

By a series of the processing described above, measurement of the position information of the terminal station 10 is completed.

It should be noted that the position measurement may be performed not only by the position acquisition request from the terminal station 10 but also by the positioning server 20 independently and by a request from each access point 30.

Figure 7:
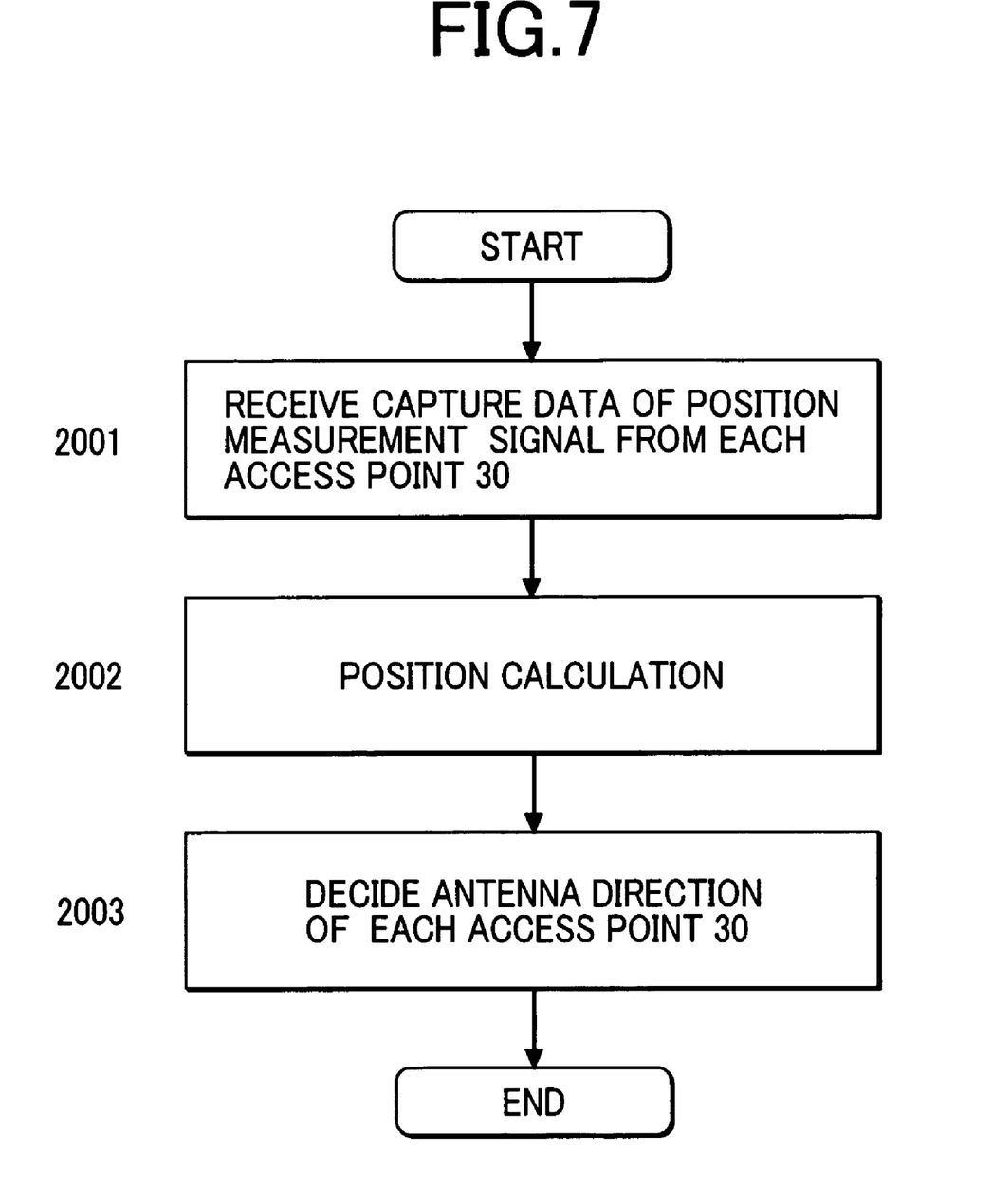
FIG. 7 is a flowchart of details of position calculation processing in the positioning server according to a second embodiment of this invention.

FIG. 7 is a flowchart of the details of the position calculation processing in the positioning server 20 according to the second embodiment.

The position measurement part 22 of the positioning server 20 receives the capture data of the positioning measurement signal from each access point 30, which has been transmitted through the network 40 and the signal processing part 21 (step 2001).

Next, the position measurement part 22 calculates the position of the terminal station 10 based on the received capture data of the positioning measurement signal of each access point 30 (step 2002).

Next, the directivity of the antenna 31 of each access point 30 is decided from the position information of the terminal station 10, which is calculated by the position calculation, and from the position information of each access point 30, which is recorded in the system information database 23 (step 2003). Specifically, the directivity of the antenna of each access point 30 is set in the directivity in which the terminal station 10 is present. The decided directivity is stored in the memory provided in the position measurement part 22, and when the next position acquisition request is issued, information regarding the directivity is included in the positioning data measurement preparation request to be transmitted to each access point 30, and then transmitted. Each access point 30 receives the signal by use of the directivity included in the received positioning data measurement preparation request.

In such a manner, the directivity is preset at the estimated position of the terminal station 10, which is calculated by the positioning server 20, and the next positioning is executed.

It should be noted that the positioning server 20 may take a procedure, in which the positioning server 20 sequentially a plurality of records results of the position measurement together with information indicating times, determines whether or not the terminal station 10 is moving, and based on a result thereof, sets the information regarding the directivity indicated to the access point 30. Specifically, when it is obvious that the terminal station 10 is moving, the position measurement part 22 calculates information on moving speed, moving directivity, and the like, and sets the directivity of each access point 30 to a position of the terminal station 10, which is estimated at a time when the next position measurement is performed, and the positioning server 20 makes information regarding the directivity included in the positioning data measurement preparation request, and then transmits the information.

In this case, when it is determined to be difficult to estimate the position of the terminal station 10 at the time of the next position measurement because the moving speed of the terminal station 10 is large, a configuration may be adopted such that the information regarding the directivity, which is stored in the memory, is temporarily abandoned, and that the position measurement is newly performed. Moreover, the following configuration may be adopted. Forgetting coefficients are set in response to the moving speed of the terminal station 10. When the moving speed is small, the information stored in the memory is used much, and when the moving speed is large, only approximately up-to-date information among the information stored in the memory is used.

As described above, in the positioning system according to the second embodiment of this invention, the positioning server 20 is configured so as to set the directivity corresponding to the estimated position of the terminal station 10 based on the results of the positioning measurement, and to indicate the information regarding the directivity to each access point. Accordingly, even when the terminal station 10 is moving, the accuracy in the position measurement is enhanced by the plural times of position measurement.

Next, a positioning system according to a third embodiment will be described.

In the first and second embodiments, feedback is given to each access point 30 such that the errors in the results of the position measurement for the terminal station 10 by the positioning server 20 are decreased. In the third embodiment, each access point 30 is configured so as to individually change the directivity, the frequency, and the like to set ones which bring the best received signal. It should be noted that the same reference numerals are added to the same functional constituents as those of the first or second embodiment, and description thereof is omitted.

Figure 8:
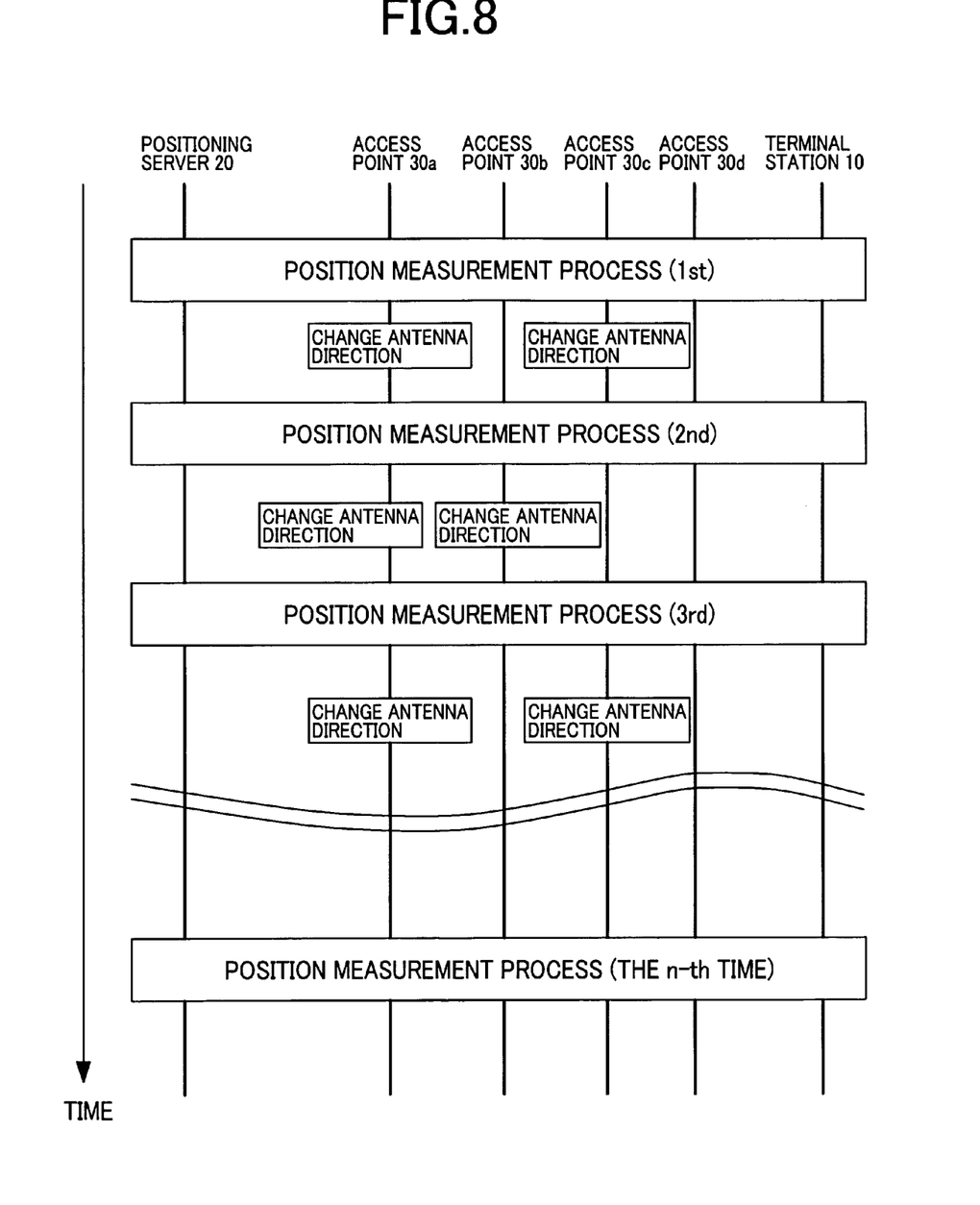
FIG. 8 is a sequential diagram of the procedure for measuring a positioning system according to a third embodiment of this invention.

FIG. 8 shows a sequence of the positioning system according to the third embodiment.

Each process of the position measurement is substantially the same as the procedure in FIG. 5.

Specifically, first, the terminal station 10 transmits the position acquisition request for requesting the position measurement of itself to the positioning server 20. Upon receiving the position acquisition request, the positioning server 20 first transmits the positioning data measurement preparation request to each access point 30. In this case, information regarding the frequency and the like of the signal transmitted by the positioning server may be included according to needs.

Upon receiving the positioning data measurement preparation request, each access point 30 prepares a setting of the directivity of the antenna 31, and the like. When the preparation is completed, each access point 30 transmits a completion reply of the positioning data measurement request to the positioning server 20.

Upon receiving the completion replies of the positioning data measurement requests from all the access points 30, the positioning server 20 first sends, to the access point 30a, an instruction to transmit the positioning measurement signal requests. Upon receiving the instruction, the access point 30a transmits the positioning measurement signal requests to the other access points 30b, 30c, and 30d, and the terminal station 10. The access point 30a stores a transmitted time of the positioning measurement signal requests, and the access points 30b, 30c, and 30d store received times of the positioning measurement signal requests.

Upon receiving the positioning measurement signal requests, the terminal station 10 transmits the positioning measurement signal replies to the respective access points 30. The respective access points 30a, 30b, 30c, and 30d individually store received times of the positioning measurement signal replies.

Next, each of the access points 30a, 30b, 30c, and 30d calculates the time differences between capture data of the positioning measurement signals between the received time of the positioning measurement signal request and the received time of the positioning measurement signal reply. Then, each access point 30 creates the capture data of the positioning measurement signal from the time differences between capture data of the positioning measurement signals and from other information, and transmits the capture data of the positioning measurement signal to the positioning server 20. This capture data of the positioning measurement signal includes, for each access point 30, information regarding the directivity of each antenna 31 and information regarding each access point 30.

In this case, each access point 30 transmits a received time of a positioning measurement signal reply of which received strength is the highest and a received time of a positioning measurement signal request corresponding to the positioning measurement signal reply to the positioning server 20 independently of the others. For this purpose, the transmission of the positioning measurement signal request and the positioning measurement signal reply is performed plural times, and the respective positioning measurement signal requests and positioning measurement signal replies are received by the antennas set in different directivity in the access points 30, and the received power strengths and the received times are measured. It should be noted that, when each access point 30 includes the array antenna, it is satisfactory that the access point 30 receive the positioning measurement signal reply once and measures the received power strengths and the received times for the plurality of directivity.

Upon receiving the capture data of the positioning measurement signals individually from the access points 30a, 30b, 30c, and 30d, the positioning server 20 executes position calculation processing of the terminal station 10 based on the information.

Next, the positioning server 20 transmits position information of the terminal station 10, which has been decided by the position calculation processing, to the terminal station 10.

By a series of the processing described above, the measurement of the position information of the terminal station 10 is completed. A series of this positioning procedure is executed repeatedly.

Then, prior to the next position measurement process, each access point 30 individually changes the directivity thereof. It should be noted that, when the antenna 31 is composed of an adaptive array antenna, the directivity in which the received signal strength becomes the strongest turns out by one receipt of the signal, and accordingly, the access point 30 transmits a result of use of the directivity to the positioning server. Otherwise, every time when the positioning procedure is executed (or every predetermined number of the position measurement processes), the access point 30 changes the directivity, and receives the signal. When the terminal station 10 is not moving, or when the moving speed thereof is small, the directivity in which the received signal strength is the largest turns out as a result of changing the directivity. Accordingly, each access point 30 receives the position measurement signal requests by use of the directivity.

In FIG. 8, an example is shown, where the access point 30a is set to change the directivity every time, the access point 30b is set to change the directivity before odd number-th position measurement processes, the access point 30c is set to change the directivity before even number-th position measurement processes, and the access point 30d is set not to change the directivity.

It should be noted that, in the third embodiment also, a configuration may be adopted such that the frequency and the polarization are changed as described in the first embodiment. Specifically, the frequency or the polarization is changed every time when the positioning procedure is implemented, and a frequency or a polarization, in which the received signal strength is the strongest, is used. In the case of changing the frequency, the positioning server 20 decides the frequency in advance, makes the frequency included in the positioning data measurement preparation request, and then transmits the frequency to each access point 30.

In the positioning system according to the third embodiment, which is configured as described above, the directivity, the polarization, the frequency, and the like, in which the received signal strength becomes the largest on each access point 30 side, are selected. Thus, the errors in the position measurement of the terminal station 10 can be decreased, and a load in the case of the position calculation by the positioning server 20 can be reduced.

With regard to the change of the directivity, the polarization, and the frequency, not only the change is made such that the received signal strength becomes the highest, but also a setting may be made to change arbitrary directivity, polarization, and frequency for each position measurement process (or every time when a predetermined number of measurement procedures are implemented).

In such a manner as described above, the occurrence of errors caused by a mistake in determination of the access point 30 can be reduced by the positioning measurement performed while changing the directivity to the arbitrary one though there is a possibility that the errors in the position measurement increase, for example, when a directivity determined to be the best by the access point 30 side is completely different from the actual orientation of the terminal station 10.

While the present invention has been described in detail and pictorially in the accompanying drawings, the present invention is not limited to such detail but covers various obvious modifications and equivalent arrangements, which fall within the purview of the appended claims.

What is claimed is:

1. A positioning system, comprising:
   a terminal station;
   a positioning server; and
   three or more access points that are each connected to the terminal station by wireless communication and each connected to the positioning server through a network,
   wherein one of the access points transmits a plurality of measurement signals to the terminal station and the other access points,
   each of the other access points receives the plurality of measurement signals in a plurality of receiving conditions, the plurality of receiving conditions being different from each other,
   the terminal station transmits to the other access points a plurality of positioning measurement signal replies,
   each of the other access points receives the plurality of positioning measurement signal replies in the plurality of receiving conditions, creates timing information based on points of time of receiving the measurement signals in the plurality of receiving conditions, points of time of receiving the positioning measurement signal replies in the receiving conditions and the plurality of receiving conditions, and transmits the created timing information to the positioning server, and the positioning server calculates a position of the terminal station based on the timing information,
   wherein the plurality of receiving conditions are selected from at least one of different directivities of antennas for receiving the signals at the other access points, different polarizations of the signals received by the other access points, and different frequencies of the signals received by the other access points.

2. The positioning system according to claim 1, wherein the positioning server calculates the position of the terminal station based on combinations of pieces of timing information regarding points of time of receiving the measurement signals in one of the plurality of receiving conditions and points of time of receiving the measurement signal replies in one of the plurality of conditions and selects, from calculated results, a result having a least error.

3. The positioning system according to claim 1, wherein the other access points select a receiving condition among the plurality of receiving conditions, and receive the signals from the terminal station in the selected receiving condition, the selected receiving condition maximizing strengths of the signals.

4. The positioning system according to claim 1, wherein the access points select a receiving condition among the plurality of receiving conditions every predetermined number of times a signal is received from the terminal station.

5. A positioning method, which is used in a positioning system that includes a terminal station and three or more access points that are each connected to the terminal station by wireless communication and which is used to measure a position of the terminal station based on information regarding points of time of receiving signals transmitted to the access points from the terminal station or one of the access points, the positioning method, comprising:
   a first step of transmitting, by one of the access points, a plurality of measurement signals to the terminal station and the other access points;
   a second step of receiving, by the other access points, the plurality of measurement signals in a plurality of receiving conditions, the plurality of receiving conditions being different from each other;
   a third step of transmitting, by the terminal station, a plurality of positioning measurement signal replies;
   a fourth step of receiving, by each of the other access points, the plurality of replies to the measurement signals in the plurality of receiving conditions;
   a fifth step of creating, by each of the other access points, timing information based on points of time of receiving the measurement signals in the receiving conditions, points of time of receiving the positioning measurement signal replies in the plurality of receiving conditions and the plurality of receiving conditions;
   a sixth step of transmitting, by the other access points, the created timing information to the positioning server; and
   a seventh step of calculating, by the positioning server, a position of the terminal station based on the timing information,
   wherein the plurality of receiving conditions are selected from at least one of different directivities of antennas for receiving the signals at the other access points, different polarizations of the signals received by the other access points, and different frequencies of the signals received by the other access points.

6. The positioning method according to claim 5, wherein the seventh step includes the steps of calculating a position of the terminal station based on combinations of pieces of the timing information regarding points of time of receiving the measurement signals in one of the plurality of receiving conditions and points of times of receiving the measurement signal replies in one of the plurality of receiving conditions; and selecting, from calculated results, a result having a least error.

7. The positioning method according to claim 5, wherein the fourth step includes the steps of:

selecting a receiving condition among the plurality of receiving conditions; and receiving the signals from the terminal station, the selected receiving condition maximizing strengths of the signals received from the terminal station.

8. The positioning method according to claim 5, wherein the fourth step includes the step of selecting a different receiving condition among the plurality of receiving conditions every predetermined number of times a signal is received from the terminal station.

9. A positioning server, which is connected to three or more access points each connected to a terminal station by wireless communication, wherein the positioning server receives from the access points timing information regarding points of time of receiving signals by the access points in a plurality of receiving conditions, and measures a position of the terminal station based on the timing information regarding points of time of receiving the signals, the plurality of receiving conditions being different from each other, the positioning server, comprising:

a position measurement unit for calculating a position of the terminal station based on combinations of pieces of the timing information regarding points of time of receiving the measurement signals; and a selecting unit for selecting, from calculated results, a result having a least error, wherein the plurality of receiving conditions are selected from at least one of different directivities of antennas for receiving the signals at the other access points, different polarizations of the signals received by the access points, and different frequencies of the signals received by the other access points.

10. The positioning system according to claim 1, wherein the plurality of receiving conditions use different transmission powers for receiving the signals at the access points, respectively.

11. The positioning method according to claim 5, wherein the plurality of receiving conditions use different transmission powers for receiving the signals at the access points, respectively.

12. The positioning server according to claim 9, wherein the plurality of receiving conditions use different transmission powers for receiving the signals at the access points, respectively.

* * * * *